United States Patent
Sarrigeorgidis et al.

(10) Patent No.: US 10,511,462 B2
(45) Date of Patent: Dec. 17, 2019

(54) DC OFFSET CANCELATION FOR WIRELESS COMMUNICATIONS

(71) Applicant: Apple Inc., Cupertino, CA (US)

(72) Inventors: Konstantinos Sarrigeorgidis, Sunnyvale, CA (US); Tarik Tabet, Los Gatos, CA (US); Lydi Smaini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/375,245

(22) Filed: Dec. 12, 2016

(65) Prior Publication Data

US 2017/0195147 A1 Jul. 6, 2017

Related U.S. Application Data

(60) Provisional application No. 62/275,286, filed on Jan. 6, 2016.

(51) Int. Cl.
*H04L 25/06* (2006.01)
*H04B 1/30* (2006.01)
*H04L 27/26* (2006.01)

(52) U.S. Cl.
CPC .............. *H04L 25/062* (2013.01); *H04B 1/30* (2013.01); *H04B 2001/305* (2013.01); *H04L 27/2647* (2013.01)

(58) Field of Classification Search
CPC . H03J 2200/02; H03J 7/02; H04L 2027/0065; H04L 25/063; H04L 27/142
See application file for complete search history.

(56) References Cited

U.S. PATENT DOCUMENTS

| 5,818,544 | A | * | 10/1998 | Han | H04L 27/066 348/725 |
|---|---|---|---|---|---|
| 7,079,595 | B2 | | 7/2006 | Jensen et al. | |
| 7,702,037 | B2 | | 4/2010 | Driesen et al. | |
| 8,180,004 | B2 | | 5/2012 | Lin et al. | |
| 9,036,723 | B2 | | 5/2015 | Zhang et al. | |
| 2005/0041759 | A1 | * | 2/2005 | Nakano | H04L 25/061 375/324 |
| 2005/0181729 | A1 | * | 8/2005 | Ibrahim | H03J 7/02 455/41.2 |

(Continued)

*Primary Examiner* — Janice N Tieu
(74) *Attorney, Agent, or Firm* — Kowert Hood Munyon Rankin & Goetzel, P.C.; Jeffrey C. Hood; Michael B. Davis (57) ABSTRACT

Techniques are disclosed relating to DC interference cancelation in received wireless signals. Disclosed techniques may be performed in the digital domain, in conjunction with analog cancelation techniques. In some embodiments, a receiver apparatus operates a local oscillator at a frequency corresponding to a particular pilot symbol in a received wireless signal. In some embodiments the receiver estimates DC interference at the frequency based on the received pilot symbol (this may be facilitated by the fact that the contents of pilot symbols are known, because they are typically used for channel estimation). In some embodiments, the receiver apparatus is configured to cancel the DC interference based on the estimate to determine received data in subsequently received signals at the frequency. Disclosed techniques may allow narrowband receivers to efficiently use more of their allocated frequency bandwidth, rather than wasting bandwidth near the frequency of the local oscillator.

20 Claims, 5 Drawing Sheets

(56) References Cited

U.S. PATENT DOCUMENTS

| | | | | |
|---|---|---|---|---|
| 2006/0052062 A1* | 3/2006 | Heddergott | ........... | H04L 25/024 455/67.11 |
| 2007/0242599 A1* | 10/2007 | Gorday | ................ | H04L 25/061 370/208 |
| 2009/0046694 A1* | 2/2009 | Matsumoto | ........... | H04L 5/0007 370/343 |

* cited by examiner

DC OFFSET CANCELATION FOR WIRELESS COMMUNICATIONS

PRIORITY CLAIM

This application claims the benefit of U.S. Provisional Application No. 62/275,286, filed on Jan. 6, 2016, which is incorporated by reference herein in its entirety.

FIELD

The present application relates to wireless communications, and more particularly DC offset cancelation in wireless receivers.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Conventionally, frequency division multiplexing (FDM) systems such as OFDM avoid transmission of data on tones corresponding to baseband direct current (DC) signals to avoid interference by the DC signals. Such interference may be caused by leakage of the local oscillator at the receiver, for example. Analog cancelation of the DC interference may be insufficient to reliably receive signals on carrier frequencies near local oscillator frequencies. Refraining from transmitting using subcarriers corresponding to DC, however, may reduce bandwidth, which may be especially costly in the context of narrowband receivers.

SUMMARY

Techniques are disclosed relating to DC interference cancelation in received wireless signals. Disclosed techniques may be performed in the digital domain, in conjunction with analog cancelation techniques. In some embodiments, a receiver apparatus operates a local oscillator at a frequency corresponding to a particular pilot symbol in a received wireless signal. In some embodiments the receiver estimates DC interference at the frequency based on the received pilot symbol (this may be facilitated by the fact that the contents of pilot symbols are known, because they are typically used for channel estimation). In some embodiments, the receiver apparatus is configured to cancel the DC interference based on the estimate to determine received data in subsequently received signals at the frequency.

In some embodiments, the receiver is configured to cancel the DC interference based on an analysis of multiple pilot symbols at the frequency. This may increase cancelation performance but may reduce overall bandwidth, relative to DC interference estimation based on a single pilot symbol. Disclosed techniques may allow narrowband receivers to efficiently use more of their allocated frequency bandwidth, rather than wasting bandwidth near the frequency of the local oscillator.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms may be used in the present disclosure.
3GPP: Third Generation Partnership Project
3GPP2: Third Generation Partnership Project 2
APN: Access Point Name
BLER: Block Error Rate (same as Packet Error Rate)
BER: Bit Error Rate
CRC: Cyclic Redundancy Check
DL: Downlink
GBR: Guaranteed Bit Rate
GSM: Global System for Mobile Communications
IMS: IP Multimedia Subsystem
IP: Internet Protocol
LTE: Long Term Evolution
MME: Mobility Management Entity
MO: Message Originating
MT: Message Terminating
NAS: Non-access Stratum
PCC: Policy and Charging Control
PCEF: Policy and Charging Enforcement Function
PCRF: Policy and Charging Rules Function
PCSCF: Proxy Call Session Control Function
PGW: Packet Gateway
PER: Packet Error Rate
QCI: Quality of Service Class Index
QoS: Quality of Service
RRC: Radio Resource Control
SGW: Serving Gateway
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System
VoLTE: Voice Over LTE

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., a smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
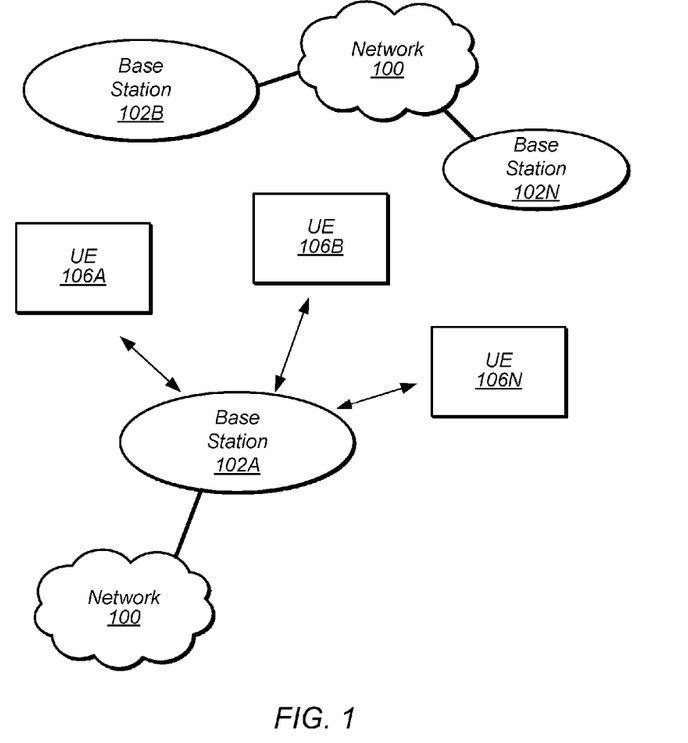
FIG. 1 illustrates an exemplary (and simplified) wireless communication system, according to some embodiments.
Figure 2:
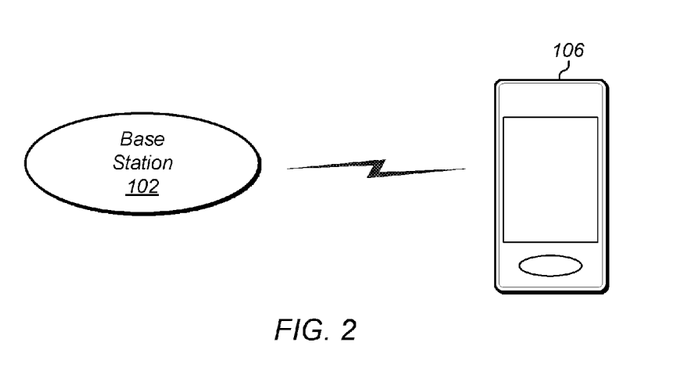
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A-106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-160N and similar devices over a wide geographic area via one or more cellular communication standards.

Thus, while base station 102A may act as a "serving cell" for UEs 106A-160N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A-106N) in communication with a base station 102 (e.g., one of the base stations 102A-102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. Alternatively, or in addition, the UE 106 may include one or more integrated circuits configured to perform any of the method embodiments described herein.

The UE 106 may include one or more antennas for communicating using one or more wireless communication protocols or technologies. In some embodiments, the UE 106 is configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

Figure 3:
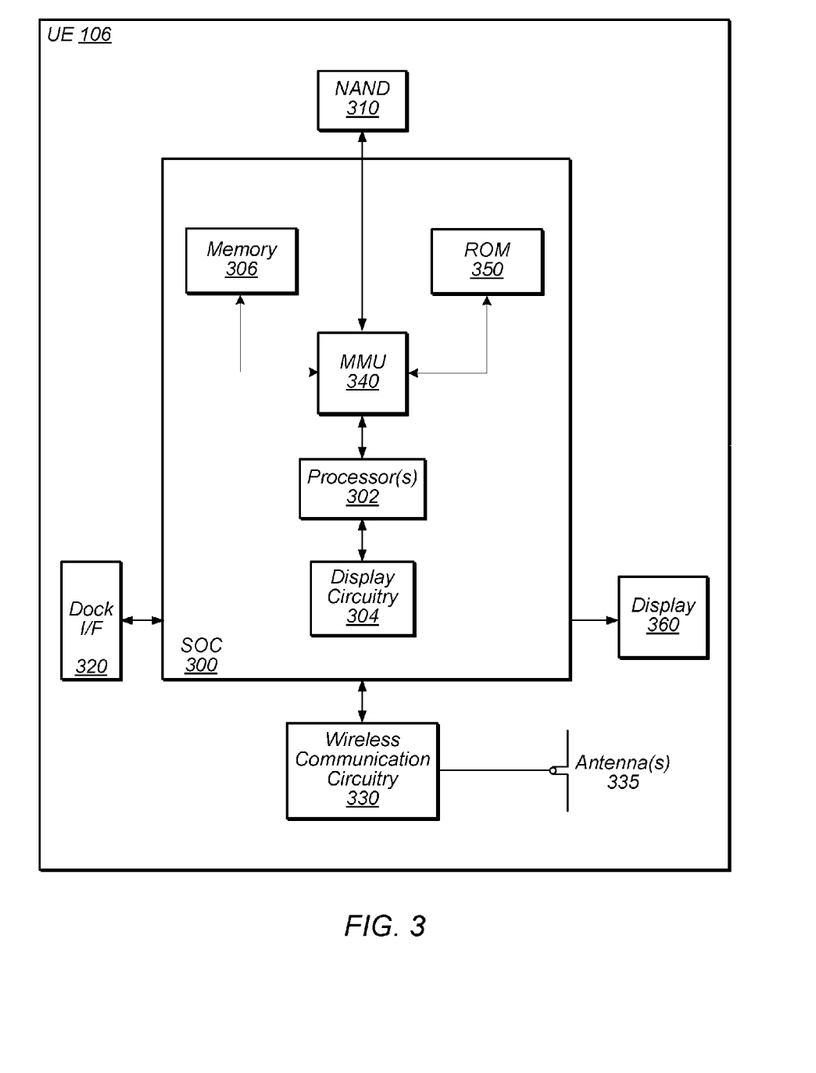
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include processing elements for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein.

Although disclosed embodiments are discussed in the context of a mobile device, similar techniques may be used for non-mobile devices, such as base stations, for example, in other embodiments.

Overview of DC Interference at Wireless Receivers

Wireless receivers typically down-convert incoming signals at different carrier frequencies to an intermediate frequency (IF) by mixing the incoming signals with signals generated by a local oscillator (LO). In many implementations (e.g., direct-conversion receivers where the local oscillator's frequency is the same as, or close to, the carrier frequency of the intended signal) local oscillator energy may leak through the mixer stage. This may create a DC offset signal that may interfere with received signals.

Traditionally, the modulation of the DC tone is skipped in OFDM systems to avoid this interference. This may reduce overall bandwidth, which may be significant in narrowband receivers. Narrow-band receivers may often be used in low-power devices, where efficient utilization of available bandwidth is important to reduce battery drain, for example.

Figure 4:
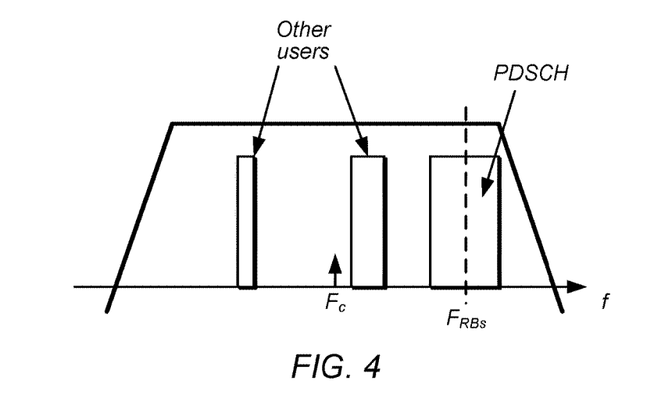
FIG. 4 illustrates exemplary bandwidth allocations, according to some embodiments.

In the example shown in FIG. 4, the right-most rectangle represents a portion of the frequency band (centered at $F_{RBs}$) that is assigned to a particular receiver. The other two rectangles represent portions of the frequency band allocated to other users. One design option would use a local oscillator frequency for this receiver at $F_C$, which would avoid DC offset for the received signals. This, however, would consume additional power because of the need for a higher bandwidth receiver for the rest of the analog chain, including baseband filters, ADCs, etc. In contrast, a narrowband receiver may be used if the local oscillator is centered at $F_{RBs}$, but this introduces the DC offset interference, as discussed above. Generally, narrowband receivers may consume lesser power than wider-band receivers, e.g., because their ADCs can run at a lower frequency. Also note that placing the local oscillator frequency between subcarriers may still result in DC interference to those subcarriers because of spillage.

Therefore, in some embodiments, wireless receiver circuitry (e.g., in UE 106) is configured to estimate and cancel the DC offset in order to demodulate a corresponding tone. In some embodiments, DC offset cancelation is performed in both the analog and digital domains. The analog cancelation may be performed using known calibration techniques, in some embodiments. In various embodiments, analog cancelation alone may not entirely cancel the DC offset, leaving a residual DC offset in output signals from an analog to digital converter (ADC). At least a portion of this DC offset may be canceled in the digital domain, in various embodiments, as discussed below.

Exemplary DC Cancelation Techniques

Figure 5:
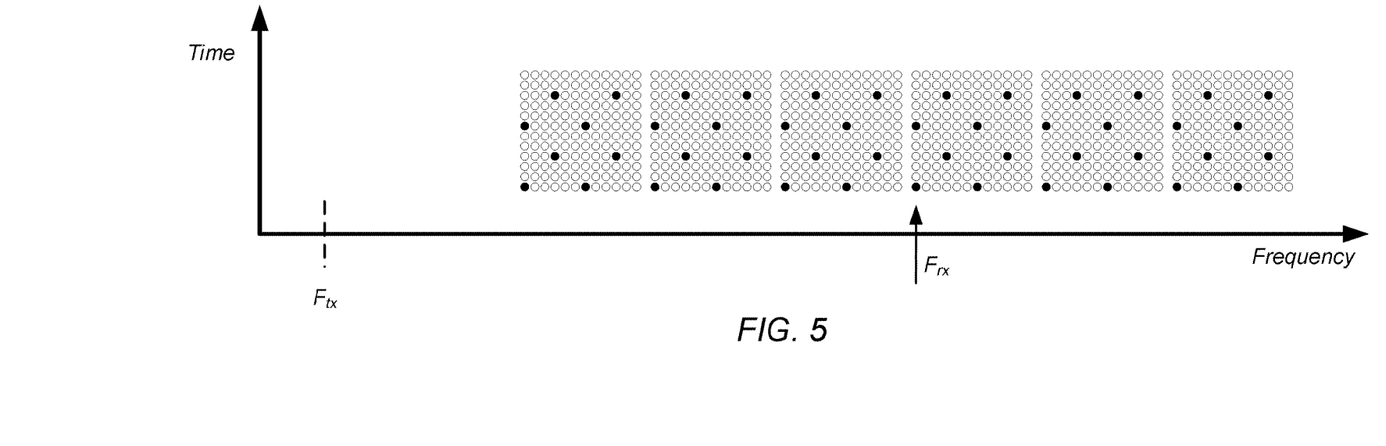
FIG. 5 illustrates an exemplary oscillator frequency that is selected to correspond to a pilot subcarrier, according to some embodiments.

FIG. 5 illustrates received signaling that includes six resource blocks (RBs) at different frequencies allocated to the receiver, according to some embodiments. In the illustrated embodiment, pilot symbols in the first, fourth, seventh, and tenth subcarrier in each RB are shown using solid circles for illustration. In some embodiments, the receiver is configured to place the local oscillator frequency at a subcarrier frequency corresponding to a pilot symbol (at $F_{rx}$ in the example of FIG. 5). This may prevent the pilot symbol(s) at this subcarrier in this RB from being used for channel estimation, but may facilitate DC offset cancelation. In some embodiments, the wireless receiver circuitry is configured to select a subcarrier at or near the middle of its allocated frequency band (e.g., if the six resources blocks of FIG. 5 are allocated, $F_{rx}$ is in the middle of this band). Note that $F_{rx}$ is selected, in some embodiments, based on the frequency band assigned to the receiver by a base station. Thus, the receiver may operate its local oscillator at different frequencies, in various embodiments, depending on the allocated frequency band.

In some embodiments, the wireless receiver circuitry is configured to estimate the DC offset at the local oscillator frequency based on the pilot symbol. For example, equation (1) below describes a relationship between received and transmitted signals, according to some embodiments:

$$Y_k = H_k X_k + DC + N \qquad (1)$$

where $Y_k$ represents a received signal, $X_k$ represents a known pilot symbol included in the received signal, $H_k$ represents the channel, DC represents the DC offset, and N represents noise. The wireless receiver circuitry may determine the DC offset based on the received signal, the known pilot symbol, and channel estimates that it determines based on other pilot symbols (e.g., using 2D interpolation in time and frequency).

In some embodiments, the wireless receiver circuitry is configured to generate a channel estimate corresponding to the pilot symbol using interpolation, e.g., in the time and/or frequency dimensions, based on channel estimates for other nearby pilot symbols. Thus, the inability to use the particular pilot symbol for channel estimation may have little to no effect on channel estimation performance.

In some embodiments, the wireless receiver circuitry is configured to cancel the estimated DC offset in order to demodulate data on the subcarrier in subsequently received RBs at the oscillator frequency (not shown in FIG. 6). For example, the wireless receiver circuitry may subtract the estimated DC offset from the signal being processed. This may allow use of the subcarrier for data reception even though it overlaps with the local oscillator frequency. Note that any data resource elements on the particular subcarrier in the RB with the pilot symbol may be unused or lost, but this may typically correspond to only a small portion of a communication. This may increase available bandwidth for receivers by using the subcarrier corresponding to DC, without significantly reducing performance.

In some embodiments, placing the local oscillator at the center of a subcarrier may avoid spillage to adjacent subcarriers. In other embodiments, DC offset spillage may also be estimated and canceled. Further, the disclosed techniques may be backwards compatible, as they may be performed by a UE without knowledge of the base station or a need to alter wireless communications standards.

In some embodiments, the wireless receiver circuitry is configured to generate a DC estimate by averaging over multiple pilot symbols, e.g., using a filter in the time domain. A Kalman filter is one example of such a filter, although other filter types may be used as appropriate. For example, the receiver may use multiple different pilot symbols received at different times to generate DC estimates and filter the DC estimates to generate a filtered DC estimate. Any of various appropriate filters, averages, and/or weights may be used to generate such a DC estimate. Depending on the number of pilot symbols used, this may slightly reduce throughput (e.g., because data symbols on the subcarriers used for DC estimation are lost) while increasing the performance of the DC cancelation relative to DC estimates using a single pilot symbol.

Exemplary Method

Figure 6:
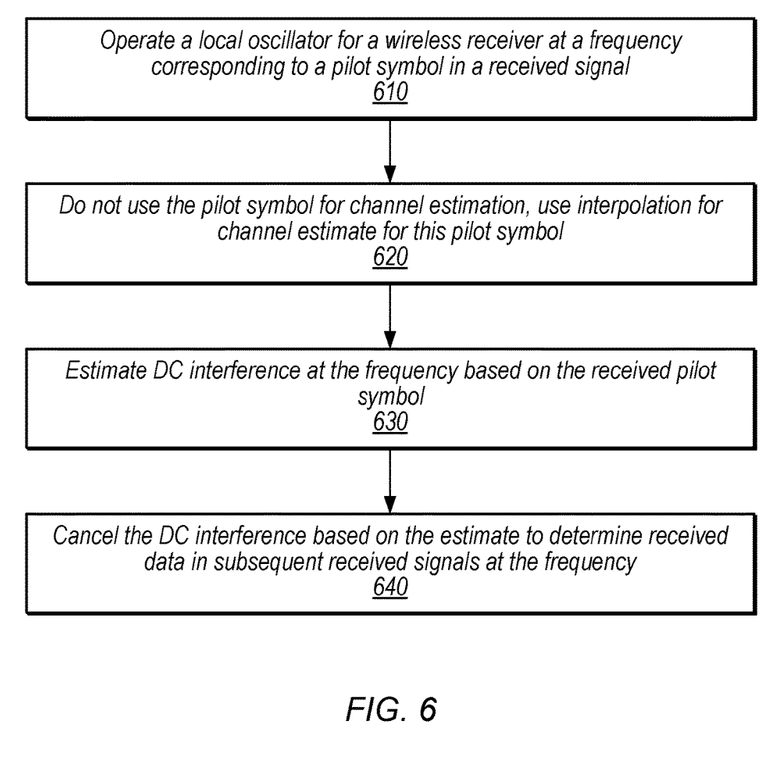
FIG. 6 illustrates an exemplary method for DC interference cancelation, according to some embodiments.

FIG. 6 is a flow diagram illustrating a method for DC interference cancelation, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 610.

At 610, in the illustrated embodiment, an apparatus operates a local oscillator for a wireless receiver at a frequency corresponding to a pilot symbol in a received signal. The local oscillator may utilize a phase-locked loop (PLL) to achieve the desired frequency. Note that it is well understood that the local oscillator operating at the same frequency as the subcarrier does not necessarily mean that the frequencies are exactly identical (at least because it is highly unlikely that any two real-world signals have exactly the same frequency). Rather, setting the local oscillator to the subcarrier frequency means that the subcarrier and local oscillator are at the same nominal frequency over a particular time interval, with variations from the nominal frequency within acceptable bounds.

At 620, in the illustrated embodiment, the apparatus does not use the pilot symbol for channel estimation, but uses interpolation to determine a channel estimate corresponding to the pilot symbol based on one or more nearby pilot symbols. The nearby pilot symbols may be close to the pilot symbol in frequency and/or time. In some embodiments, this interpolation may be omitted and the pilot symbol may simply be ignored.

At 630, in the illustrated embodiment, the apparatus estimates DC interference at the frequency based on the received pilot symbol. In some embodiments, this estimation is based on equation (1), for example.

At 640, in the illustrated embodiment, the apparatus cancels the DC interference based on the estimate to determine (e.g., demodulate) received data in subsequent received signals at the frequency. Note that "canceling" the DC interference may not entirely eliminate the interference, e.g., based on errors in the estimate and/or imperfections in subtraction of the estimated DC offset. Rather, the term "canceling" is to be construed according to its well-understood meaning in the art, which includes reducing the magnitude of the signal being canceled (e.g., by subtracting the signal being canceled or applying the inverse of the signal being canceled), which may allow detection of other desired signals.

In some embodiments, the method elements of FIG. 6 are performed in the digital domain, after conversion of received analog symbols to digital symbols. As discussed above, the techniques of FIG. 6 may be used in conjunction with analog cancelation of DC offset.

The disclosed techniques may allow a low power receiver to achieve better performance for channel allocations smaller than the channel bandwidth (e.g., in LTE). In some embodiments, the entire receive chain is narrowband, such that information is only captured in the bandwidth assigned to the receiver. This may be particularly useful for low-power devices that are link-budget limited. The disclosed techniques may minimize performance loss (e.g., for small allocations such as 1.4 MHz channels, losing one subcarrier may be significant). Further, as discussed above, the receiver may place the local oscillator frequency independent of any control by the base station, providing backwards compatibility with existing network infrastructure, in various embodiments.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 7:
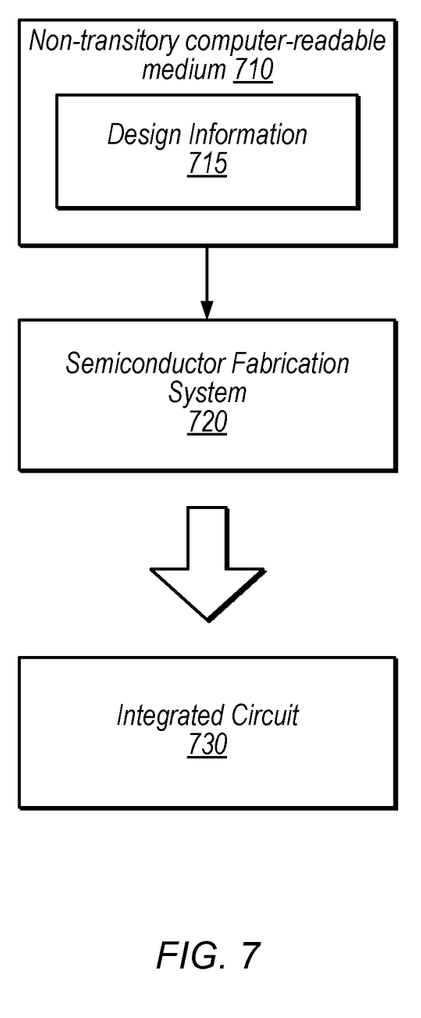
FIG. 7 illustrates an exemplary computer-readable medium, according to some embodiments.

FIG. 7 is a block diagram illustrating an exemplary non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable medium 710, may comprise any of various appropriate types of memory devices or storage devices. Medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 710 may include other types of non-transitory memory as well or combinations thereof. Medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabrication at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1-3. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

Embodiments described as using a particular technology (e.g., custom circuitry) may also be implemented using other technologies (e.g., a processor and a memory, an FPGA, etc.).

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising one or more processing elements configured to:
   operate a local oscillator at a frequency corresponding to a particular pilot symbol in a received wireless signal, wherein the received wireless signal includes pilot symbols at multiple different frequencies;
   estimate, based on the received particular pilot symbol, direct current (DC) interference at the frequency caused by leakage of energy from the local oscillator; and
   subtract the estimated DC interference from subsequently-received signals at the frequency to determine received data.

2. The apparatus of claim 1, wherein the apparatus is configured not to use the particular pilot symbol for channel estimation.

3. The apparatus of claim 1, wherein the one or more processing elements are further configured to determine a channel estimate corresponding to the particular pilot symbol using interpolation based on other pilot symbols.

4. The apparatus of claim 1, wherein the apparatus is configured to estimate the DC interference based on the received wireless signal, known data of the received pilot symbol, and channel conditions determined based on other pilot symbols.

5. The apparatus of claim 1, wherein the one or more processing elements are further configured to determine an estimate of DC interference based on multiple pilot symbols at the frequency that are received at different times.

6. The apparatus of claim 1, wherein the apparatus is a mobile device that further comprises at least one antenna configured to receive the wireless signal.

7. The apparatus of claim 1, wherein, to subtract the estimated DC interference, the one or more processing elements are configured to apply an inverse of the estimated DC interference to the subsequently-received signals.

8. A non-transitory computer-readable medium having instructions stored thereon that are executable by a computing device to perform operations comprising:
   operating a local oscillator at a frequency corresponding to a particular pilot symbol in a received wireless signal, wherein the received wireless signal includes pilot symbols at multiple different frequencies;

estimating, based on the received particular pilot symbol, direct current (DC) interference at the frequency caused by leakage of energy from the local oscillator; and subtracting the estimated DC interference from subsequently-received signals at the frequency to determine received data.

9. The non-transitory computer-readable medium of claim 8, wherein the operations further comprise using other pilot symbols for channel estimation and not using the particular pilot symbol for channel estimation.

10. The non-transitory computer-readable medium of claim 8, wherein the operations further comprise determining a channel estimate corresponding to the particular pilot symbol using interpolation based on other pilot symbols.

11. The non-transitory computer-readable medium of claim 8, wherein the DC interference is estimated based on a received signal, known data of the received pilot symbol, and channel conditions determined based on other pilot symbols.

12. The non-transitory computer-readable medium of claim 8, wherein the estimate is further based on multiple pilot symbols at the frequency that are received at different times.

13. The non-transitory computer-readable medium of claim 8, wherein the received pilot symbol used for the estimating has been processed using analog cancelation circuitry.

14. A non-transitory computer readable storage medium having stored thereon design information that specifies a design of at least a portion of a hardware integrated circuit in a format recognized by a semiconductor fabrication system that is configured to use the design information to produce the circuit according to the design, including:

one or more processing elements configured to:
    operate a local oscillator at a frequency corresponding to a particular pilot symbol in a received wireless signal, wherein the received wireless signal includes pilot symbols at multiple different frequencies;
    estimate, based on the received particular pilot symbol, direct current (DC) interference at the frequency caused by leakage of energy from the local oscillator; and
    subtract the estimated DC interference from subsequently-received signals at the frequency to determine received data.

15. The non-transitory computer readable storage medium of claim 14, wherein the design information further specifies that the circuit is configured not to use other pilot symbols for channel estimation and not to use the particular pilot symbol for channel estimation.

16. The non-transitory computer readable storage medium of claim 14, wherein the design information further specifies that the circuit is configured to determine a channel estimate corresponding to the particular pilot symbol using interpolation based on other pilot symbols.

17. The non-transitory computer readable storage medium of claim 14, wherein the design information further specifies that the circuit is configured to operate as a narrowband wireless receiver that does not use a full bandwidth available in a radio access technology implemented by the circuit.

18. The non-transitory computer readable storage medium of claim 14, wherein the design information further specifies that the circuit is configured to determine an estimate of DC interference based on multiple pilot symbols at the frequency that are received at different times.

19. The non-transitory computer readable storage medium of claim 14, wherein the DC interference is estimated based on a received signal, known data of the received pilot symbol, and channel conditions determined based on other pilot symbols.

20. The non-transitory computer readable storage medium of claim 14, wherein the design information further specifies that the circuit is configured to perform analog cancelation of the DC interference prior to canceling the DC interference based on the estimate.

* * * * *